United States Patent

Wieland

[15] 3,696,130
[45] Oct. 3, 1972

[54] PROCESS FOR THE MANUFACTURE OF ACETYLENE COMPOUNDS

[72] Inventor: Peter Wieland, Blauenweg 11, Oberwil/Basel-Land, Switzerland

[22] Filed: Aug. 25, 1970

[21] Appl. No.: 66,904

[30] Foreign Application Priority Data

Sept. 11, 1969   Switzerland............13733/69

[52] U.S. Cl..............................260/397.5, 260/397.3
[51] Int. Cl............................................C07c 167/18
[58] Field of Search..................................260/397.5; /Machine Searched Steroids

[56] References Cited

OTHER PUBLICATIONS

J. Org. Chem. 23 (1958) page 665

Primary Examiner—Elbert L. Roberts
Attorney—Harry Goldsmith, Joseph G. Kolodny and Mario A. Monaco

[57] ABSTRACT

The present invention relates to a new process for the manufacture of acetylene compounds by decomposing a compound of the formula

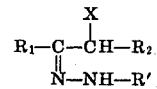

in which X is a reactively esterified hydroxyl group, e.g. a hydroxy group esterified with an organic sulfuric acid or with a halic acid, R' is a nucleofuge group and one of the residues $R_1$ and $R_2$ represents an organic radical and the other hydrogen or an organic radical.

10 Claims, No Drawings

PROCESS FOR THE MANUFACTURE OF ACETYLENE COMPOUNDS

The present invention relates to a novel process for the manufacture of acetylene compounds of general formula $$R_1-C \equiv C-R_2$$

wherein one of the residues $R_1$ and $R_2$ represents an organic residue and the other denotes hydrogen or an organic residue, and these residues can also be bonded to one another to give at least eight-membered rings, and wherein the carbon atoms of the organic residues $R_1$ and $R_2$ which are bonded to the acetylene structure either only carry hydrogen and/or carbon atoms or are parts of an aromatic ring.

It is known that the manufacture of acetylene compounds starting from compounds with the same carbon number often causes difficulties and in most cases only succeeds via a multi-stage involved process.

It has now been found that the compounds characterized above can easily be obtained if a hydrazone of general formula

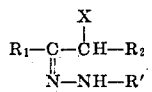

wherein $R_1$ and $R_2$ have the above-mentioned significance, R' denotes a nucleofugic group, especially the acyl residue of a sulphonic acid such as a lower alkanesulphonic acid, for example the methanesulphonic or ethanesulphonic acid, or of an aromatic, especially monocyclic aromatic, sulphonic acid, such as of benzene-, toluene-, halogenobenzene- or nitrobenzene-, primarily p-toluene-sulphonic acid, and X denotes a reactively esterified hydroxyl group, for example a hydroxyl group esterified with a strong inorganic or organic acid, for example a strong carboxylic acid or especially sulphonic acid, for example the above-mentioned sulphonic acids, or also by a strong mineral acid, especially by hydrogen halide of molecular weight less than 130, is allowed to decompose with evolution of nitrogen. This reaction in most cases already takes place on leaving the material to stand at room temperature, or on gentle warming. The start of the reaction can be assisted by adding buffers or inorganic or organic bases, for example alkali metal hydroxides, alkali metal alcoholates such as sodium methylate or potassium t-butylate, or pyridine or piperidine, respectively, or also by means of acid reagents such as for example Bronstedt acids such as acetic acid, sulphuric acid or phosphoric acid. The reaction is appropriately carried out in polar solvents such as methanol, ethanol, dimethylsulphoxide, dimethylformamide, methylene chloride, chloroform, acetone or glacial acetic acid.

In many cases the decomposition takes place extremely easily. Thus the starting substances can in most cases already decompose in the desired manner under the conditions under which they are formed, for example when reacting a ketone of formula

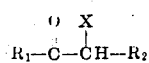

with the hydrazine of formula $H_2NNH-R'$. This reaction is carried out in a manner which is usual for the hydrazone formation, for example in a polar solvent such as in a lower aliphatic alcohol, for example methanol, ethanol or propanol, in dimethylsulphoxide, dimethylformamide and/or in a lower aliphatic carboxylic acid such as acetic acid.

The starting substances can however also be formed in situ on esterifying an α-hydroxyhydrazone of formula

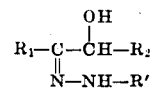

wherein $R_1$, $R_2$, X and R' have the above-mentioned significance, with a strong inorganic or organic acid, such as preferably an organic sulphonic acid, for example methanesulphonic acid, and react further in accordance with the invention. The esterification is carried out in the usual manner, preferably with reactive derivatives, especially anhydrides or halides of organic sulphonic acids.

In the starting substances, which are thus derived from an α-hydroxycarbonyl compound of formula

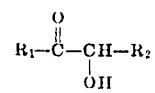

at least one of the residues $R_1$ and $R_2$ preferably denotes one of the following residues: (a) a saturated or unsaturated acyclic hydrocarbon residue which possesses a straight or branched carbon chain, or (b) a saturated or unsaturated mononuclear or polynuclear optionally nuclear-substituted alicyclic hydrocarbon residue or (c) a mononuclear or polynuclear aromatic hydrocarbon residue, or (d) a mononuclear or polynuclear aralkyl or aralkenyl residue, or (e) a mononuclear or polynuclear aromatic heterocyclic residue.

If the residues $R_1$ and $R_2$ are joined to one another, then they together represent at least six-membered saturated or unsaturated hydrocarbon residues such as alkylene or alkenylene residues, which can optionally carry a fused, alicyclic, aromatic or heterocyclic residue. At the same time these residues can carry functional groups in a higher position than the 1-position, such as for example halogen atoms, lower alkyl groups, free, esterified or etherified mercapto groups such as lower alkylmercapto groups, free, esterified or etherified hydroxyl groups, for example lower alkoxy groups, nitro groups, free or preferably functionally modified carboxyl groups, for example carboxy, carbamyl, nitrile or ester groups, or further free or preferably protected oxo groups.

As preferred starting substances there should further be mentioned those which are derived from steroids, of which the hydrazone and ester group are present in a side-chain, primarily in the 17-position, especially those of the pregnane, 19-nor-pregnane, or 19-nor-pregnatriene series. These steroids can otherwise, except in the α-position to the carbon atoms carrying the hydrazone and ester groups, be substituted in the usual manner.

It is obvious that in the case of starting substances which would lead to extremely highly stressed cyclic systems or which cannot contain an acetylene bond the decomposition does not take place in the desired manner.

The process according to the invention can be employed in the most diverse fields of the organic chemical industry. Using the new process it is for example possible to manufacture di-substituted acetylene compounds which were hitherto only accessible with difficulty, or not accessible at all.

The process according to the invention is for example suitable both for the manufacture of known scents and flavoring substances which were hitherto only obtainable according to involved and uneconomical processes, and for making available numerous new scents and flavoring substances. Starting from suitably substituted pentan-1-ol-2-ones and hexan-1-ol-2-ones, it is possible by means of the new process to manufacture numerous partly known and partly new unsaturated aliphatic acetylenes which can easily be converted into the corresponding compounds with a cis-double bond, for example by partial catalytic hydrogenation.

The steroid-ines obtained according to the new process, especially those of the oestrane, androstane, pregnane, cholane or cholestane series, are in most cases intermediate products for the manufacture of biologically active steroids. If they possess the grouping which is essential in known active steroids, they also have interesting pharmacological effects.

The starting substances used in accordance with the invention are known or can be obtained in a manner which is in itself known.

The invention is described in more detail in the examples which follow.

EXAMPLE 1

Two hundred milligrams of toluene-4-sulphonic acid hydrazide and 300 mg of potassium acetate are added to a solution of 400 mg of 3$\beta$-acetoxy-20-oxo-21-mesyloxy-$\Delta^5$-pregnene in 10 ml of glacial acetic acid and 30 ml of methylene chloride, while stirring. After 2 days the mixture is poured into 240 ml of saturated sodium hydrogen carbonate solution and is extracted with methylene chloride. The residue from the organic solutions which have been washed with water, dried and evaporated in vacuo is chromatographed on 12 g of aluminum oxide (activity I). The fractions eluted with a benzene-petroleum ether (3:7) mixture yields 3$\beta$-acetoxy-17$\beta$-ethinyl-$\Delta^5$-androstene, which after recrystallization from ether-pentane melts at 145°–148° C.

A solution of 1.01 g of potassium carbonate in 8.75 ml of water is added to 540 mg of the ethinyl compound obtained above and 40.5 ml of methanol, in a stream of nitrogen, while stirring. After 4 hours the mixture is poured into water, extracted with methylene chloride, and the extract washed with water, dried and evaporated in vacuo. The crystalline 3$\beta$-hydroxy-17$\beta$-ethinyl-$\Delta^5$-androstene thus obtained is dissolved in 38 ml of toluene and 5.6 ml of cyclohexanone, after which 10 ml are distilled off. After adding a solution of 800 mg of aluminum isopropylate in 8 ml of toluene, the mixture is allowed to boil for 1 hour. It is then mixed with 2.88 ml of glacial acetic acid, poured into sodium potassium tartrate solution and repeatedly extracted with toluene. The residue from the organic solutions which have been washed with sodium potassium tartrate solution, dried and evaporated in vacuo is chromatographed on 70 g of aluminum oxide (activity I). 3-oxo-17$\beta$-ethinyl-$\Delta^4$-androstene of melting point 154.5°–156.5° C is obtained from the fractions eluted with toluene by crystallization from ether-pentane.

EXAMPLE 2

Two hundred milligrams of toluene-4-sulphonylhydrazine and 300 mg of potassium acetate are added to a solution of 333 mg of 3$\beta$-acetoxy-20-oxo-21-fluoro-$\Delta^5$-pregnene in 10 ml of glacial acetic acid and 30 ml of methylene chloride, while stirring. After 3 days, the mixture is worked up and chromatographed, as indicated in Example 1. The 3$\beta$-acetoxy-17$\beta$-ethinyl-$\Delta^5$-androstene thus obtained is identical with that obtained in Example 1.

EXAMPLE 3

2.24 g of toluene-4-sulphonic acid hydrazide and 1.6 g of potassium acetate are added to a solution of 1.38 g of 1-bromo-cyclohepta-deca-2,10-dione in 150 ml of methylene chloride and 50 ml of glacial acetic acid while stirring. After 67 hours the mixture is poured into 1.2 l of saturated sodium hydrogen carbonate solution, extracted with methylene chloride, washed with water, dried and evaporated in vacuo. On chromatography of the residue on 75 g of silica gel, the toluene-4-sulphonylhydrazone of 9,10-dehydrocibetone is obtained from the fractions eluted with toluene-ethyl acetate (49:1) mixture. It melts at 114°–117° C after recrystallization from a methylene chloride-ether-petroleum ether mixture.

Five hundred ten milligrams of the tosylhydrazone thus obtained together with 20 ml of glacial acetic acid are added to a solution of 1.5 g of lead tetraacetate in 100 ml of glacial acetic acid. Ten minutes later 750 mg of oxalic acid are added and after a further 20 minutes the mixture is filtered through celite, rinsing with methylene chloride. The filtrate is washed with sodium hydrogen carbonate solution, dried and evaporated in vacuo. After filtering the crude product in toluene solution through 25 g of silica gel and distilling the evaporation residue at 0.05 mm and 140° C bath temperature, 9,10-dehydrocibetone is obtained as a colorless oil.

One hundred twenty-nine milligrams of 9,10-dehydrocibetone are dissolved in 10 ml of petroleum ether and shaken in a hydrogen atmosphere with the addition of 40 mg of Lindlar catalyst. After 1 mol equivalent of hydrogen has been taken up, the catalyst is filtered off and the filtrate evaporated in vacuo. The cibetone thus obtained proved identical with an authentic preparation.

EXAMPLE 4

A solution of 2 g of benzoin and 2.2 g of toluene-4-sulphonic acid hydrazide in 50 ml of alcohol and 30 ml of methylene chloride is left to stand for 42 hours at room temperature. It is then poured into water, extracted with methylene chloride, and the extract washed with water, dried and evaporated in vacuo. Crystallization of the residue from ether yields the toluene-4-sulphonic acid hydrazone of benzoin, of melting point 138°–141° C.

Two milliliters of methanesulphonyl chloride are added to a solution of 1.81 g of the hydrazone obtained above in 20 ml of pyridine, while cooling with an ice-sodium chloride mixture. After 2 hours the cooling is removed and the mixture is left to stand for 16 hours at room temperature. It is then poured into 250 ml of water, and the mixture stirred for 1 hour and subsequently repeatedly extracted with ether. The residue of the organic solutions which have been washed with dilute hydrochloric acid and water, dried and evaporated is first filtered through 4.9 g of aluminum oxide (activity II) (rinsing with 100 ml of toluene). The evaporation residue of the eluate is subsequently chromatographed on 4.9 g of aluminum oxide (activity II), with diphenylacetylene being eluted with petroleum ether. It shows no lowering of the melting point with an authentic preparation.

I claim:

1. Process for the preparation of acetylene compounds of the general formula

in which one of the residues $R_1$ and $R_2$ represents an organic residue of the oestrane, androstane, pregnane, cholane or cholestane series and the other denotes hydrogen or an organic residue of the oestrane, androstane, pregnane, cholane or cholestane series, and wherein the carbon atoms of $R_1$ and $R_2$ which are bonded to the acetylene structure either carry only hydrogen and/or carbon atoms, by decomposing a hydrazone of the formula

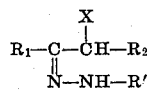

in which $R_1$ and $R_2$ have the significance as above, $R'$ denotes the acyl residue of a sulfonic acid and X represents a reactively esterified hydroxyl group, with evolution of nitrogen.

2. Process according to claim 1, wherein the starting materials are formed in situ.

3. Process according to claim 2, wherein starting materials are used which are formed by reacting a ketone of the formula

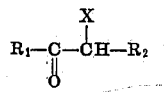

wherein $R_1$, $R_2$ and X have the significance as above, with a hydrazine of the formula $$H_2NNH-R'$$

in which $R'$ is a nucleofugic group the acyl residue of a sulfonic acid.

4. Process according to claim 2, wherein starting materials are used which are formed by esterifying an α-hydroxy hydrazone of the formula

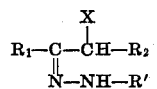

in which $R_1$, $R_2$ and $R'$ have the significance as above, with a strong anorganic or inorganic acid.

5. Process according to claim 1, wherein $R'$ is the acyl residue of a lower alkane sulphonic acid.

6. Process according to claim 1, wherein $R'$ is the acyl residue of an aromatic sulphonic acid.

7. Process according to claim 6, wherein the aromatic sulphonic acid is a monocyclic aromatic sulphonic acid.

8. Process according to claim 7, wherein the aromatic sulphonic acid is p-toluene sulphonic acid.

9. Process according to claim 1, wherein X is a hydroxyl group esterified with a sulphonic acid or with a hydrogen halide having a molecular weight less than 130.

10. Process according to claim 1, wherein $R_1$ represents the 3β-acetoxy-Δ⁵-androstene-17-yl, $R_2$ denotes hydrogen, $R'$ is the residue of p-toluene sulphonic acid and X represents a hydroxy group esterified with a lower alkane sulphonic acid or with a hydrogen halide.

* * * * *

PO-1050
(5/69)

UNITED STATES PATENT OFFICE
CERTIFICATE OF CORRECTION

Patent No. 3,696,130          Dated October 3, 1972

Inventor(s) PETER WIELAND

It is certified that error appears in the above-identified patent and that said Letters Patent are hereby corrected as shown below:

Column 1, insert

-- [73] Assignee: CIBA-GEIGY CORPORATION --

Signed and sealed this 19th day of February 1974.

(SEAL)
Attest:

EDWARD M. FLETCHER, JR.
Attesting Officer

C. MARSHALL DANN
Commissioner of Patents